June 14, 1960

C. L. WEBER 2,940,798

RELAY OR TRIPLE VALVE

Filed Dec. 28, 1956

INVENTOR.
Charles L. Weber
BY
Adelbert O. Steinmiller
ATTORNEY

United States Patent Office 2,940,798
Patented June 14, 1960

2,940,798
RELAY OR TRIPLE VALVE

Charles L. Weber, Pittsburgh, Pa., assignor to Westinghouse Air Brake Company, Wilmerding, Pa., a corporation of Pennsylvania Filed Dec. 28, 1956, Ser. No. 631,296

7 Claims. (Cl. 303—28)

This invention relates to a multi-purpose control valve device and more particularly to a valve device variously conditionable so as to operate as a triple valve device in fluid pressure operated railway braking apparatus at one time or as a relay valve device for general control use at another time.

Triple valve devices and relay valve devices have certain common elements such as an operating piston or diaphragm type piston and supply and release valve elements for causing supply of fluid under pressure to and release of fluid under pressure from a receiving device, such as a brake cylinder. However, in the case of a triple valve, the operating piston is subject to brake pipe pressure on one side and auxiliary reservoir pressure on the other and operation of the triple valve device is controlled by variations of pressure in the brake pipe. In a relay valve device the piston is subjected to a control fluid pressure on one side to cause supply of fluid under pressure to the receiving device, the piston being restored to its position for lapping-off the supply of fluid under pressure to the receiving device when the pressure supplied to the receiving device acting on the piston device in opposition to the control pressure reaches substantial equivalency to the control pressure.

In view of the equivalency of the elements of a triple valve device and a relay valve device, therefore, it is possible to utilize the same valve elements in a cooperative manner to function either as a triple valve device or as a relay valve device provided suitable changes in the fluid pressure connections to the valve elements are made.

It is accordingly the principal object of the present invention to provide a multi-purpose valve device of the type described and employing changeover means for converting the valve device to operate alternatively as a triple valve device or as a relay valve device.

Another object is to provide a multi-purpose valve device of the type indicated in the foregoing object and characterized in that the changeover means is a manually operable valve selectively positionable in a first or a second position to condition the valve device to operate at one time in one fluid pressure system as a triple valve device and at another time in another fluid pressure system as a relay valve device.

Other objects and advantages will be apparent from the following more detailed description of the invention.

Figure 1:
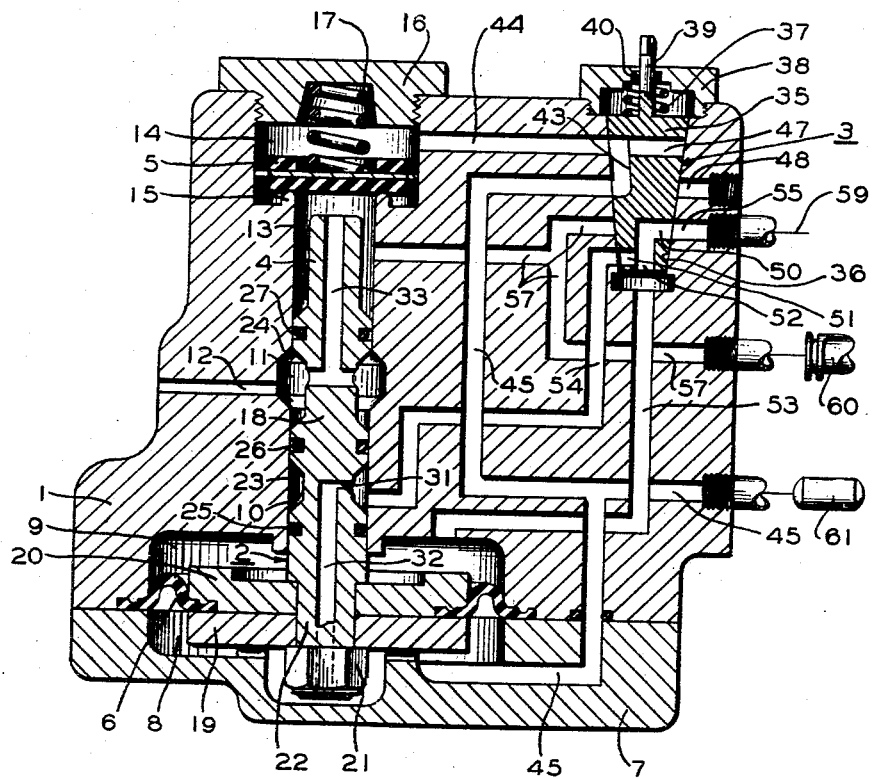
Figure 2:
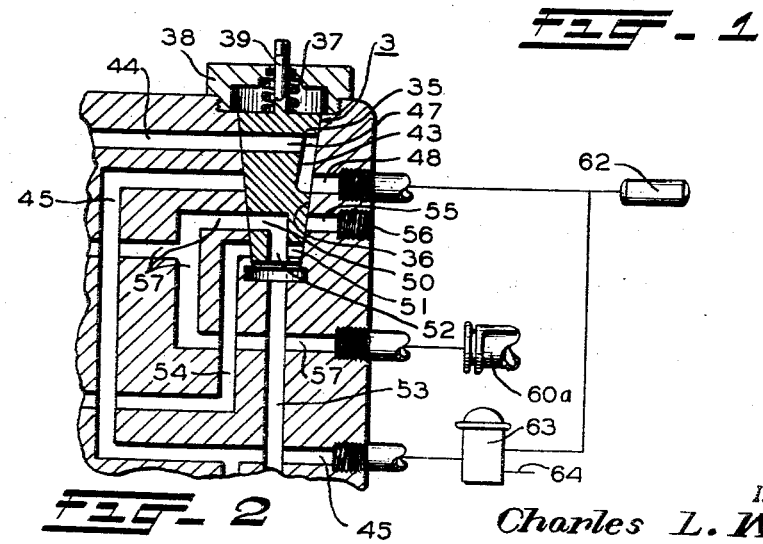

In the accompanying drawings; Fig. 1 is a diagrammatic sectional view of the multi-purpose control valve device embodying the invention and showing a changeover valve in the position to condition the control valve device to operate as a triple valve device; and Fig. 2 is a partial sectional view of the valve device of Fig. 1, showing the changeover valve moved to the position to condition the device to operate as a relay valve device.

Description

As shown in Fig. 1 of the drawing, the multi-purpose control valve device comprises a casing section 1 embodying therein in a parallel arranged relationship a fluid pressure operated supply and release valve mechanism 2 and a manually operated changeover valve 3 operable to condition the valve mechanism 2 to operate either as a triple valve device or as a relay valve device according to the selected position of said changeover valve.

Considering the fluid pressure operated supply and release valve mechanism 2 in greater detail, said valve mechanism comprises two coaxially related valve members 4 and 5 operable by fluid pressure exerted on a diaphragm 6 operably connected to the member 4 and suitably secured in the casing section 1 by a clamping cover 7 attached to said casing section in any suitable manner.

Two chambers 8 and 9 are formed respectively at opposite sides of the diaphragm 6. Chamber 9 is connected by a bore 10 to a chamber 11 in the body 1, said chamber 11 being open to atmosphere through a passage 12 formed in the body 1. The chamber 11 is connected by a bore 13, coaxial with and of substantially the same diameter as the bore 10, to a chamber 14. Contained in chamber 14 is a disc valve member 5 which cooperates with an annular valve seat 15 formed on the casing surrounding the end of bore 13 and projecting into chamber 14. Interposed between the upper face of valve member 5 and a screw plug 16 closing the open end of chamber 14 is a spring 17 for resiliently seating said valve member on the seat 15 to normally close communication between said chamber and the bore 13.

The valve member 4 comprises a spool valve 18 slidably mounted in the bores 10 and 13. One end of the spool valve 18 extends into the chamber 9 and is connected centrally with the diaphragm 6 by means of two diaphragm followers 19 and 20 and a nut 21 having screw-threaded engagement with a stem 22 extending from said one end of said spool valve.

The spool valve 18 is provided intermediate its ends with two spaced annular grooves 23 and 24 formed on the outer periphery thereof and with three, axially spaced-apart O-ring seals 25, 26 and 27 disposed in corresponding annular recesses open to the peripheral surface of said spool valve; said rings having sealing and sliding contact with the wall of bores 10 and 13 to minimize leakage of fluid pressure from chamber 9 and the upper end of bore 13 to the annular groove 23 open to the peripheral surface of said spool valve between said rings and chamber 11, respectively. The groove 23 is open to the chamber 8 by way of a small port or choked passageway 31 in spool valve 18, said port opening into said groove and being connected to a longitudinally extending passageway 32 in said spool valve leading to the end thereof that is disposed in said chamber. The groove 24 is open to atmosphere by way of the chamber 11 and passage 12. Groove 24 is also open to the bore 13 on the opposite side of O-ring seal 27 by way of a passageway 33 in spool valve 18, passageway 33 having one end opening into said groove and the other opening at the free end of the spool valve beneath valve member 5.

The changeover valve 3 comprises a tapered rotary valve element 35 spring-pressed into a tapered bore 36 in the casing section 1 by a spring 37 disposed between the large end of said valve element and a screw plug 38 closing the open end of bore 36. Extending upward from the large end of valve element 35 and formed integral therewith is an operating shaft 39 which extends through a bore in the screw plug 38. A sealing ring 40 disposed in an annular recess in the screw plug 38 has sealing contact with the shaft 39 to prevent leakage of fluid under pressure past said shaft to atmosphere.

A removable handle or wrench (not shown) may be mounted on an outer squared end of shaft 39 to effect movement of rotary valve element 35 between the position in which it is shown in Fig. 1, in which the multi-purpose control valve device is conditioned to operate as a triple valve device, and the position in which it is shown in Fig. 2 in which said valve device is conditioned to operate as a relay valve device.

The rotary valve element 35 has a milled groove 43 which, in the position in which the valve element is shown in Fig. 1, establishes a communication between a passageway 44 formed in body 1 and leading to chamber 14, and a passageway 45, also formed in said body and leading to chamber 8 at the lower side of diaphragm 6. A branch of passageway 45 opens at the surface of casing 1 through a tapped port, hereinafter identified as the fourth casing port for receiving a threaded pipe.

The rotary valve element 35 is further provided with a transversely drilled passage 47 opening at one end into the milled groove 43 and at the other end at the peripheral surface of the valve element. With valve element 35 in the position in which it is shown in Fig. 2, the passage 47 together with the groove 43 form a first port establishing a communication between the passageway 44 and a passageway 48 formed in body 1 and opening at the surface of casing 1 through a tapped port, hereinafter identified as the first casing port, for receiving a threaded pipe.

The valve element 35 also has three connected passages 50, 51 and 52 to form a second port. Passages 50 and 51 are so located as to register with respective passages 55 and 54 in the casing. Passage 55 opens at the exterior of the casing 1 through a tapped port, hereinafter identified as the second casing port, to receive a threaded pipe. Passage 54 leads to and opens into the bore 10 at the groove 23. Passage 52 opens at the lower end of the valve element into a chamber which is connected by a passage 53 to chamber 9 at the upper side of diaphragm 6.

With the valve element in the position in which it is shown in Fig. 2, passage 50 registers with a passage 57 in the casing, which passage has two branches, one of which opens into bore 13 above seal ring 27 and the other of which opens at the surface of casing 1 through a tapped port, hereinafter referred to as the third casing port, for receiving a threaded pipe, while passage 51 is lapped or closed at the surface of the tapered bore 36.

With the valve device conditioned as shown in Fig. 1, for use as a triple valve device, the valve device may be connected in a fluid pressure brake system, as shown, with a brake pipe 59 connected to passage 55, a brake cylinder 60 connected to passage 57, and an auxiliary reservoir 61 connected to passage 45.

With the valve device conditioned as shown in Fig. 2, passage 48 may be connected through a suitable pipe or conduit to a supply reservoir 62, while passage 45 may be connected to the delivery pipe of a self-lapping type control valve 63, which is also connected through a suitable pipe to the supply reservoir. A brake cylinder 60a may be connected to the same passage 57 as in Fig. 1.

In the operation of the multi-purpose control valve device, assuming that the changeover valve 3 is in the position to condition the multi-purpose control valve device to operate as a triple valve device, which is the position in which it is shown in Fig. 1, that the brake pipe 59, brake cylinder 60 and auxiliary reservoir 61 are connected to the multi-purpose control valve device as described above and are at atmospheric pressure, and that the spool valve 18 occupies the position in which it is shown in Fig. 1, fluid under pressure supplied to charge the brake pipe 59 to normal pressure carried therein, will flow from this pipe to the passageway 55 and through the passage 50 in the valve element 35 to the passageway 54 from whence it flows through the annular groove 23, choked passageway 31 and passageway 32 in the spool valve 18 to the chamber 8 at the lower side of diaphragm 6.

Fluid which is supplied to the chamber 8 flows therefrom by way of passageway 45 to the auxiliary reservoir 61 thereby charging this reservoir with fluid under pressure. Fuid supplied to the passageway 45 also flows through the milled groove 43 in the valve element 35 to the passageway 44 which leads to the chamber 14 above supply valve member 5, thereby charging said chamber to auxiliary reservoir pressure which, when the equipment is fully charged, is the same as brake pipe pressure.

The chamber 9 at the upper side of diaphragm 6 is charged from the brake pipe 59 by way of passageway 55, passages 50 and 52 in valve element 35, and passageway 53 so that the opposite sides of said diaphragm are subject to the same pressure when the auxiliary reservoir 61 is fully charged to brake pipe pressure.

In the release position of the triple valve device, the brake cylinder 60 is vented to atmosphere by way of the brake cylinder pipe connected to passageway 57, bore 13, passageway 33 in spool valve 18, chamber 11 and exhaust passageway 12.

If, after the equipment is charged with fluid under pressure, a chosen reduction in pressure in brake pipe 59 is made at a service or an emergency rate, by means of a usual brake valve device (not shown), fluid will also be correspondingly vented from the chamber 9 at the upper side of diaphragm 6 through passageway 53, passages 52 and 50 in valve element 35 and passageway 55 connected to brake pipe 59. At the same time, fluid is vented from chamber 8 at the lower side of diaphragm 6 through passageway 32, choke 31, passageway 54, passages 51 and 50 in the valve element 35, and passageway 55 to the brake pipe 59. The choke 31 restricts the rate of flow of fluid from chamber 8 and thereby causes a differential of pressure to be created on opposite sides of diaphragm 6 since the pressure in chamber 8 cannot reduce as fast as the pressure in chamber 9.

When a sufficient differential of pressure is created to overcome the friction between spool valve 18 and the walls of bores 10 and 13, diaphragm 6 will be deflected upwardly, and through the medium of stem 22, shifts spool valve 18 relative to the wall of bores 10 and 13. As the spool valve 18 is thus shifted, it laps the passage 54 in the body 1, thus closing the communication between the chamber 8 and said passageway so as to prevent backflow of fluid under pressure from the chamber 8 and the auxiliary reservoir 61 to the brake pipe 59. After flow through passageway 32 and choke 31 is closed, the pressure in chamber 9 continues to reduce through passageway 53, passages 52 and 50, and passageway 55 to the brake pipe 59 to thereby increase the differential of pressure acting on diaphragm 6. The continued movement of spool valve 18 in response to the increasing differential of pressure on opposite sides of diaphragm 6 causes the spool valve 18 to move upwardly relative to body 1 until the upper end thereof engages the lower face of supply valve member 5 to close the communication between brake cylinder 60 and atmosphere.

When the differential of pressure on opposite sides of diaphragm 6 is sufficient to overcome the force of spring 17, spool valve 18 will continue its upward movement and unseat supply valve member 5 from its seat 15. With valve member 5 unseated, a fluid pressure communication is established by which fluid under pressure is supplied from auxiliary reservoir 61 to the brake cylinder 60, this communication extending from the auxiliary reservoir 61 by way of passageway 45, groove 43 in valve element 35, passageway 44, chamber 14, past unseated valve 5 to bore 13 and thence through passageway 57 to the brake cylinder 60. With the above-described communication established, fluid under pressure will flow from auxiliary reservoir 61 to brake cylinder 60 until the pressure in chamber 8 connected to the auxiliary reservoir 61 is reduced an amount substantially equal to the degree of brake pipe reduction in the chamber 9, whereupon the diaphragm 6 and spool valve 18 will move downwardly to a service lap position in which the supply valve member 5 engages seat 15 and thus closes off the further flow of fluid under pressure from the auxiliary reservoir 61 to the brake cylinder 60.

If, after a limited application of the brakes has been effected, it is desired to increase the brake cylinder pressure, a further reduction in brake pipe pressure is effected (through the medium of the brake valve device) which causes the diaphragm 6 and spool valve 18 to move upwardly from service lap position toward service position unseating supply valve member 5 from its seat 15 so that fluid under pressure again flows from the auxiliary reservoir 61 to the brake cylinder 60. With supply valve member 5 thus unseated, fluid under pressure will continue to flow from the auxiliary reservoir to the brake cylinder until the pressure in chamber 8 is again reduced an amount substantially equal to the degree of brake pipe reduction in chamber 9, whereupon the diaphragm 6 and spool valve 18 will move downwardly to service lap position in which the supply valve member 5 again engages seat 15 and thus closes off further flow of fluid under pressure from the auxiliary reservoir to the brake cylinder.

From the above it will be evident that it is possible to obtain any brake cylinder pressure desired up to a full service or an emergency application in which auxiliary reservoir pressure and brake cylinder pressure equalize, in a series of small increments or stages.

To effect a release of the brakes after a service or an emergency application, fluid under pressure is supplied to the brake pipe 59 from whence it flows to chamber 9 through passageway 55, passages 50 and 52 and passageway 53.

The increase in brake pipe pressure in chamber 9 creates a differential of pressure on the diaphragm 6 which causes the diaphragm and thereby spool valve 18 to move to release position in which position they are shown in Fig. 1 of the drawing. In release position, the choke 31 is open through annular groove 23 to the passageway 54, so that fluid under pressure is permitted to flow from the brake pipe 59 to chamber 8 and the auxiliary reservoir 61 through the communication which has been hereinbefore described in connection with the initial charging of the equipment.

With fluid under pressure flowing from the brake pipe 59 to chambers 9 and 8 and auxiliary reservoir 61 as described above, said chambers and reservoir will be charged to the normal brake pipe pressure carried on the train and brake cylinder 60 will be reconnected to atmosphere by way of passage 57, bore 13, passage 33 in spool valve 18 and exhaust passage 12, thereby effecting release of the brake application.

Subsequent to a release of the brakes, a reapplication can be effected to any desired degree by reducing brake pipe pressure an amount corresponding to the degree of brake cylinder pressure desired.

Now let it be supposed that it is desired to condition the multi-purpose control valve device to operate as a relay valve device. To do so, the rotary valve element 35 of the changeover valve 3 is manually rotated, as by means of a handle or a wrench applied to the squared end of shaft 39, from the position in which it is shown in Fig. 1 to the position in which it is shown in Fig. 2. Furthermore, let it be assumed that the fluid pressure supply reservoir 62 is connected by a suitable pipe to the passage 48, that a brake cylinder or other external fluid pressure operated device such as a fluid motor 60a is connected to passage 57, and that a control valve device 63 is connected to control the supply of fluid under pressure from the supply reservoir 62, or any other suitable source of fluid pressure, to the passage 45.

It may be noted that the chamber 9 and brake cylinder or fluid motor 60a are connected to atmosphere at this time. The chamber 9 is connected by passageway 53, passages 52 and 50 to passageway 57 to which fluid motor 60a is connected. The passageway 57 opens into the bore 13 which is connected to atmosphere through passageway 33, chamber 11 and passage 12.

In the operation of the multi-purpose control valve device as a relay valve device, assuming that the supply reservoir 62 is charged with fluid to some chosen pressure, let it be supposed that the control valve device 63 is operated to cause the supply of fluid under pressure from supply reservoir 62 to passageway 45 and to chamber 8 until the pressure in said chamber is built up to any desired degree.

It will be noted that fluid under pressure supplied to chamber 8 may flow through passageway 32, choke 31 and annular groove 23 to passageway 54 but cannot escape from passageway 54 since the end thereof is lapped at the valve element 35. Therefore fluid under pressure supplied to chamber 8 is effective to deflect diaphragm 6 upwardly and, through the medium of stem 22, shift spool valve 18 relative to the wall of bores 10 and 13, upwardly until the upper end thereof engages the lower face of supply valve member 5 to close the communication between the fluid motor 60a and atmosphere.

When the pressure in the chamber 8 is built up sufficiently to overcome the force of spring 17, spool valve 18 will continue its upward movement and unseat supply valve member 5 from its seat 15. With valve member 5 unseated, a fluid pressure communication is established from supply reservoir 62 through passageway 48, groove 43 in the valve element 35, port 47, passageway 44, chamber 14, past unseated valve 5 to bore 13 and thence through passageway 57 to the fluid motor 60a. Concurrently with the supply of fluid under pressure to the fluid motor 60a, fluid under pressure is also supplied to the chamber 9 through a branch of passageway 57, passages 50 and 52 of valve element 35, and passageway 53.

When the pressure of fluid in the chamber 9 and fluid motor 60a becomes substantially equal to the pressure of fluid in chamber 8, the spring 17 and fluid under pressure in chamber 14 act to seat supply valve member 5 on seat 15. With the supply valve member 5 in seated engagement with the upper end of spool valve 18 the exhaust valve member 4 is maintained closed when said supply valve member engages seat 15 and closes off the supply of fluid under pressure to the chamber 9 to prevent downward deflection of diaphragm 6. The relay valve device is now in lap position with the supply and exhaust valve members both closed and the pressure in chamber 9 and fluid motor 60a equal to the control pressure supplied by the control valve device 63 to chamber 8.

If the pressure in the fluid motor 60a is less than the pressure in supply reservoir 62 and it is desired to increase the pressure in said fluid motor, the control valve device 63 is again operated to supply fluid under pressure from said supply reservoir to chamber 8 to increase the pressure in said chamber. This increase in pressure in chamber 8 causes the diaphragm 6 and supply valve member 5 to be operated to again effect the supply of fluid under pressure to the chamber 9 and fluid motor 60a until the pressures therein are equal to the increased pressure in chamber 8.

When it is desired to release fluid under pressure from the fluid motor 60a, the control valve device 63 is operated to close the communication for the supply of fluid under pressure from supply reservoir 62 to the passageway 45 and chamber 8, and to establish a communication between said passageway and an atmospheric exhaust pipe 64 to permit the pressure in said chamber to be reduced to some chosen degree which may be atmospheric pressure or some pressure above atmospheric pressure.

Assuming that the several parts of the relay valve device are in lap position when fluid under pressure is vented from chamber 8, fluid under pressure in chamber 9 acting on the upper side of diaphragm 6 causes the diaphragm together with spool valve 18 to move downwardly. When spool valve 18 starts to move downwardly from lap position toward release position in which position said spool valve is shown in Fig. 1, the upper end of said spool valve, which constitutes the release valve member 4, is moved out of engagement with the lower side of supply valve member 5.

With the release valve member 4 unseated, fluid under pressure flows from the chamber 9 and connected fluid motor 60a to atmosphere by way of passageway 53, passages 52 and 56, passageway 57, bore 13, passageway 33, chamber 11, and exhaust passage 12.

If the pressure retained in chamber 8 is above atmospheric pressure, the pressure in the chamber 9 and connected fluid motor 60a will be reduced to a value slightly less than the pressure in said chamber 8 whereupon the diaphragm 6 and spool valve 18 will return to lap position in which the upper end of said spool valve engages the lower face of supply valve member 5 to cut off flow from chamber 8 and fluid motor 60a to atmosphere.

If the pressure in chamber 8 is reduced to atmospheric pressure, the pressure in the chamber 9 and fluid motor 60a will also be reduced to atmospheric pressure.

Subsequent to a partial or complete release of fluid under pressure from the fluid motor 60a, an increase in the pressure of the fluid supplied to said motor can be effected to any desired degree by operation of the control valve device 63 to increase the pressure in chamber 8 to said desired degree.

*Summary*

It will be seen from the above description that I have provided a multi-purpose control valve device including a changeover valve which is manually operative to one position to condition the multi-purpose control valve device to operate at one time in one fluid pressure system as a triple valve device which is operative in response to a reduction in brake pipe pressure, to effect the supply of fluid under pressure from an auxiliary reservoir to a brake cylinder until the pressure of the fluid supplied to said cylinder corresponds to the reduction made in said brake pipe pressure. The above-mentioned changeover valve is further effective when manually operated to a second position to condition the multi-purpose control valve device to operate at another time in another fluid pressure system as a relay valve device which is operative upon the supply of a control fluid pressure thereto to effect the supply of fluid under pressure from a separate supply reservoir to a fluid motor which may be the brake cylinder of a railway vehicle or any type of industrial cylinder having therein a piston which can be operatively connected to any device that can be actuated to any one of a plurality of positions. It will be apparent that, if desired, other means than the rotary type changeover valve, as disclosed herein, may be employed to convert the multi-purpose valve device from a triple valve device to a relay valve device or vice versa. For example, suitable removable screw-type plugs may be provided for appropriate installation and removal to effect the changes in the connection of the passages with the same result as that accomplished by the changeover valve.

Having now described the invention, what I claim as new and desire to secure by Letters Patent is:

1. A multi-purpose valve device comprising valve means operative to control the supply of fluid under pressure to and the release of fluid under pressure from a first brake cylinder, a movable abutment for operating said valve means, and changeover means for at one time establishing a communication between a brake pipe and a first chamber at one side of said abutment and a communication between the inlet side of said valve means and a second chamber at the other side of said abutment to which second chamber an auxiliary reservoir is adapted to be connected, thereby to enable fluid pressure control of the operation of said abutment to operate said valve means to cause said multi-purpose valve device to function in the manner of a triple valve device, and for at another time establishing a communication between a second brake cylinder connected to the outlet side of said valve means and said first chamber and a communication between a source of fluid pressure and the inlet side of said valve means to enable fluid pressure control of the operation of said abutment upon the supply of a control pressure to said second chamber to operate said valve means to cause said multi-purpose valve device to function in the manner of a relay valve device.

2. A multi-purpose valve device comprising a casing, a plurality of port means in said casing to which, when said valve device is to operate in the manner of a triple valve device, a brake pipe, a brake cylinder and an auxiliary reservoir may at one time be respectively connected, and to which, when said valve device is to operate in the manner of a relay valve device, a supply reservoir, a fluid receiving device and an operator's control valve device may at another time be respectively connected, valve means in said casing operative to control the supply of fluid under pressure to said brake cylinder or to said receiving device and the release of fluid under pressure therefrom, a movable abutment for operating said valve means, said abutment having a first chamber on one side and a second chamber on the opposite side thereof, means providing a communication between said second chamber and the port means to which the auxiliary reservoir or the operator's control valve device may be connected, a passageway in said casing providing a communication between said second chamber and the port means to which said brake pipe is connected to enable charging of said second chamber and said auxiliary reservoir, choke means controlling flow between said passageway and said second chamber, and changeover valve means effective at said one time to establish communication from the port means to which the auxiliary reservoir and said second chamber are connected to the inlet side of said valve means and from the port means to which the brake pipe is connected to said first chamber and said passageway to provide for control of said abutment in response to the variation in pressure in the brake pipe to operate said valve means to cause said multi-purpose valve device to function in the manner of a triple valve device, said changeover valve means being effective at said another time to establish communication from the port means to which said supply reservoir is connected to the inlet side of said valve means and from the port means to which the fluid receiving device is connected to said first chamber to provide for control of said abutment in response to the supply of fluid under pressure to said second chamber by operation of the operator's control device to operate said valve means to cause said multi-purpose valve device to function in the manner of a relay valve device.

3. A multi-purpose valve device comprising a casing, a first port means in said casing adapted to be open at one time to atmosphere and adapted to be connected at another time to a first external fluid pressure storage reservoir, a second port means in said casing adapted to be connected at said one time to an external conduit such as a brake pipe a railway brake apparatus that may be charged with fluid under pressure, and adapted to be open at said another time to atmosphere, a third port means in said casing adapted to be connected at said one time to a brake cylinder, and to be connected at said another time to an external fluid pressure operated device, and a fourth port means in said casing adapted to be connected at said one time to an auxiliary reservoir in a railway brake apparatus and to be connected at said another time to the pressure delivery port of an operator's control device in a remote control apparatus, valve means in said casing operative at said one time to control the supply of fluid under pressure between said fourth port means and said third port means to effect the supply of fluid under pressure to said brake cylinder, and operative at said another time to control the supply of fluid under pressure from said first port means to said third port means to effect the supply of fluid under pressure to said external fluid pressure operated device, a movable abutment for operating said valve means, said abutment having a first chamber at one side thereof and a second chamber on the opposite side thereof, said second chamber being connected to said fourth port means, and changeover means for at said one time establishing unrestricted communication between said second port means and said first chamber, restricted communication between said second port means and said second chamber and unrestricted communication between said fourth port means and the inlet side of said valve means to provide for fluid pressure control of said abutment in response to variations in pressure in said first chamber responsively to pressure variations in the external conduit connected to said second port means, thereby to operate said valve means to cause said multi-purpose valve device to function in the manner of a triple valve device, and for at said another time establishing communication between the outlet side of said valve means, said third port means and said first chamber, and communication between said first port means and the inlet side of said valve means, thereby to provide for fluid pressure control of said abutment in response to variations in pressure in said second chamber to operate said valve means to cause said multi-purpose valve device to function in the manner of a relay valve device.

4. A multi-purpose valve device for controlling supply of fluid under pressure to and release of fluid under pressure from a receiving device, said valve device comprising a casing having a supply chamber to which fluid under pressure may be supplied, a bore in said casing opening into said chamber, an annular valve seat on said casing at the juncture of said bore and supply chamber, a disc valve biased to seated position on said valve seat, a movable abutment in said casing cooperating therewith to provide a first chamber at one side of said abutment and a second chamber at the opposite side, said bore opening into said first chamber, a spool valve slidably operable in said bore and connected to said abutment, said spool valve having one position in which it establishes a communication through which fluid under pressure is released to atmosphere from the receiving device and operable by said abutment into contact with said disc valve to effect closing of said release communication and then unseating of said disc valve to cause supply of fluid under pressure from said supply chamber to said receiving device, a first port means in said casing adapted to be open at one time to atmosphere and adapted to be connected at another time to a first external fluid pressure storage reservoir, a second port means in said casing adapted to be connected at said one time to an external conduit that may be charged with fluid under pressure from such as a brake pipe in a railway brake apparatus, and adapted to be open at said another time to atmosphere, a third port means in said casing adapted to be connected to said receiving device which, at said one time, may be a first brake cylinder, and which, at said another time, may be a second brake cylinder, and a fourth port means in said casing adapted to be connected at said one time to an auxiliary reservoir in a railway brake apparatus and to be connected at said another time to the pressure delivery port of an operator's control device in a remote control apparatus, a first passageway in said casing providing a permanent communication between said second chamber and said fourth port means, a second passageway in said casing connected to said second chamber, a third passageway in said casing connected to said first chamber and having a greater flow capacity than said second passageway, and changeover means for at said one time establishing a first communication through which fluid under pressure may be supplied from the auxiliary reservoir connected to said fourth port means to said supply chamber, and a second communication through which fluid under pressure may flow between the external conduit such as a brake pipe connected to said second port means and said second and said third passageways in said casing to effect charging of said chambers and the auxiliary reservoir connected to said fourth port means in response to an increase in the pressure in the external conduit such as a brake pipe and operation of said abutment in response to a reduction in the pressure in the external conduit to operate said spool valve to cause said multi-purpose valve device to function in the manner of a triple valve device, and for at said another time establishing a third communication through which fluid under pressure may flow from the external storage reservoir connected to said first port means to said supply chamber and a fourth communication through which the pressure of fluid in said second brake cylinder connected to said third port means is communicated to said first chamber to enable operation of said abutment in response to the supply of fluid under pressure to said second chamber by operation of the operator's control device connected to said fourth port means to operate said spool valve to cause said multi-purpose valve device to function in the manner of a relay valve device.

5. A multi-purpose valve device comprising a casing, a first port means in said casing adapted to be open at one time to atmosphere and adapted to be connected at another time to a first external fluid pressure storage reservoir, a second port means in said casing adapted to be connected at said one time to an external conduit that may be charged with fluid under pressure from such as a brake pipe in a railway brake apparatus, and adapted to be open at said another time to atmosphere, a third port means in said casing adapted to be connected at said one time to a brake cylinder, and to be connected at said another time to an external fluid pressure operated device, and a fourth port means in said casing adapted to be connected at said one time to an auxiliary reservoir in a railway brake apparatus and to be connected at said another time to the pressure delivery port of an operator's control device in a remote control apparatus, a supply valve for controlling at said one time flow of fluid under pressure between the auxiliary reservoir connected to said fourth port means and the brake cylinder connected to said third port means, and at said another time flow between said first storage reservoir connected to said first port means and said external fluid pressure operated device, an exhaust valve operable at said one time for controlling flow of fluid under pressure between the brake cylinder and atmosphere and operable at said another time for controlling flow of fluid under pressure between the external fluid pressure operated device and atmosphere, a movable abutment having a first chamber on one side thereof and a second chamber on the opposite side, said second chamber communicating with said fourth port means, and said abutment being operable by variations of fluid pressure in one of said chambers relative to that in the other chamber to control operation of said supply valve and said exhaust valve, and changeover valve means effective at said one time to establish a pair of communications of unequal flow capacity from said second port means to said first chamber and to said second chamber respectively, and a third communication from said fourth port means to the inlet side of said supply valve to provide for fluid pressure control of said abutment to operate said supply valve and said exhaust valve to cause said multi-purpose valve device to function in the manner of a triple valve device, and effective at said another time to establish a first communication from said first port means to the inlet side of said supply valve and a second communication from the outlet side of said supply valve and said third port means to said first chamber to provide for fluid pressure control of said abutment to operate said supply valve and said exhaust valve to cause said multi-purpose valve device to function in the manner of a relay valve device.

6. A multi-purpose valve device comprising a casing, a first port means in said casing adapted to be open at one time to atmosphere and adapted to be connected at another time to a first external fluid pressure storage reservoir, a second port means in said casing adapted to be connected at said one time to an external conduit that may be charged with fluid under pressure from such as a brake pipe in a railway brake apparatus, and adapted to be open at said another time to atmosphere, a third port means in said casing adapted to be connected at said one time to a brake cylinder, and to be connected at said another time to an external fluid pressure operated device, and a fourth port means in said casing adapted to be connected at said one time to an auxiliary reservoir in a railway brake apparatus and to be connected at said another time to the pressure delivery port of an operator's control device in a remote control apparatus, valve means selectively effective to connect said third port means to atmosphere or to supply fluid under pressure to said third port means, an abutment operatively connected to said valve means and having a first chamber on one side thereof and a second chamber on the opposite side, said abutment being operable by a preponderance in pressure in one of said chambers for actuating said valve means, a first passageway in said casing constantly connecting said second chamber to said fourth port means whereby the fluid pressure in said second chamber conforms at said one time to that in the auxiliary reservoir and at said another time to that supplied by the operator's control device, a second passageway in said casing, choke means connecting said second passageway to said second chamber, a third passageway in said casing connected to said first chamber, and changeover valve means effective in one position at said one time to establish a first communication between said second port means and said second and said third passageways to effect charging of said first chamber from said second port means through said third passageway and charging of said second chamber and of the auxiliary reservoir through said second passageway and said choke means, and to establish a second communication between said fourth port means and the inlet side of said valve means to provide for fluid pressure control of said abutment to operate said valve means to cause said multi-purpose valve device to function in the manner of a triple valve device, and effective in another position at said another time to establish a third communication between said first port means and the inlet side of said valve means and a fourth communication between said third port means and said third passageway and to close communication between said second port means and said first and said second chambers to provide for fluid pressure control of said abutment to operate said valve means to cause said multi-purpose valve device to function in the manner of a relay valve device.

7. In a multi-purpose valve device, the combination with a casing having a supply chamber, a first port means in said casing adapted to be open at one time to atmosphere and adapted to be connected at another time to a first external fluid pressure storage reservoir, a second port means in said casing adapted to be connected at said one time to an external conduit that may be charged with fluid under pressure from such as a brake pipe in a railway brake apparatus, and adapted to be open at said another time to atmosphere, a third port means in said casing adapted to be connected at said one time to a brake cylinder, and to be connected at said another time to an external fluid pressure operated device, and a fourth port means in said casing adapted to be connected at said one time to an auxiliary reservoir in a railway brake apparatus and to be connected at said another time to the pressure delivery port of an operator's control device in a remote control apparatus, valve means selectively operable to connect said supply chamber to said third port means or said third port means to atmosphere, an abutment operatively connected to said valve means and subject opposingly to pressure of fluid in a first chamber on one side thereof and in a second chamber on the opposite side, said second chamber being connected to said fourth port means and said abutment being operable by a preponderance in pressure in one of said chambers for actuating said valve means, a pair of passageways in said casing each connected to one of said chambers, choke means controlling flow through that one of said passageways leading to said second chamber only so long as the pressure in said second chamber does not exceed the pressure in said first chamber to allow the creation of said preponderance of pressure, and a changeover valve means including a two-position rotary valve having a first port and a second port, said rotary valve being actuable to one position for at said one time conditioning said multi-purpose valve device for use as a triple valve device in a railway brake apparatus in which said first port establishes a communication from said second chamber and said fourth port means to said casing supply chamber while closing communication between said first port means and said casing supply chamber, and said second port establishes a communication from said second port means to said pair of passageways to effect charging of said first and said second chambers and the auxiliary reservoir connected to said fourth port means, while closing communication between said third port means and said first chamber, and actuable to a second position for conditioning said multi-purpose valve device for use as a relay valve device in a remote control system in which said first port closes communication from said second chamber and said fourth port means to said casing supply chamber and opens a communication between said first port means and said casing supply chamber, and said second port closes communication from said second port means to said pair of passageways and opens a communication between said third port means and that one of said pair of passageways connected to said first chamber.

References Cited in the file of this patent

UNITED STATES PATENTS

| | | |
|---|---|---|
| 1,215,895 | Adams | Feb. 13, 1917 |
| 1,910,936 | Super | May 23, 1933 |